April 27, 1965

J. P. BERGEVIN 3,179,978

LIQUID SEALED COOLING RING

Filed June 20, 1962

INVENTOR
JEAN PAUL BERGEVIN

BY *Herbert M. Wolfson*
ATTORNEY

United States Patent Office 3,179,978
Patented Apr. 27, 1965

3,179,978
LIQUID SEALED COOLING RING
Jean Paul Bergevin, 710 Burns St., Whitby,
Ontario, Canada
Filed June 20, 1962, Ser. No. 203,821
Claims priority, application Canada, Oct. 3, 1961,
833,030
5 Claims. (Cl. 18—14)

This invention relates to the production of tubing and more particularly to a new and improved method of producing thermoplastic tubing having no gauge bands, very close gauge tolerance and of higher quality than heretofore possible.

In the manufacture of thermoplastic tubing one common method employed is to extrude the polymer under pressure from a die having an annular orifice. This extruded tube is carried to a set of nip rolls located either vertically above or below the die. Air is admitted through an opening in the centre of the die under sufficient pressure to expand the extruded thermoplastic tube to the desired diameter. This expansion normally takes place close to the die lips where the polymer is still in a semi-molten state.

At the point at which the required diameter is reached a cooling blast of air is blown onto the tubing setting it so that no further expansion takes place. Any variation in the rate of cooling about the circumference of the tube is objectionable, since those parts of the tube which are still molten will continue to expand resulting in irregularities in the shape of the tube and in the thickness of the walls of the tube. These become apparent when the tubing is wound onto rolls, giving a very uneven irregular appearance and causing difficulty when further operations are carried out on the film.

It is becoming more and more apparent that extremely fine control is required over the cooling medium and apparatus now available does not give the degree of control required.

An object of this invention is to provide a method and apparatus to overcome these deficiencies and difficulties.

Another object is to provide a method and apparatus to permit the manufacture of a higher grade of thermoplastic tubing and film than presently possible by substantially eliminating gauge lines and variations in film thickness.

Other objects will become apparent from the following detailed description.

Referring now to the accompanying drawings.

Figure 1:
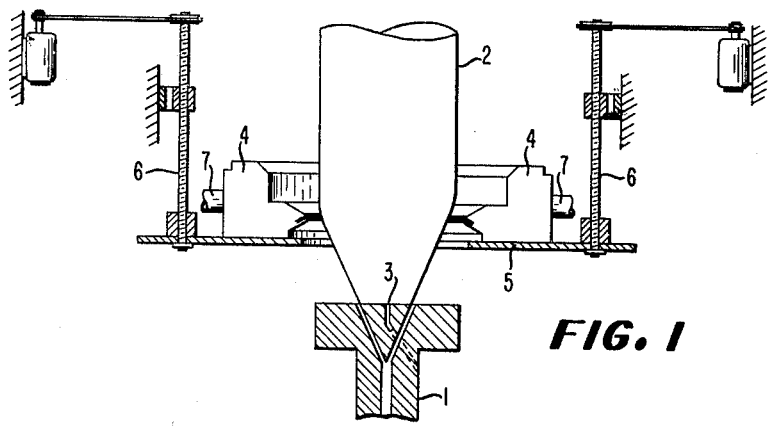
FIGURE 1 is a cross section of a blown film arrangement having an annular orifice die, a cooling ring above the die and the thermoplastic tubing extruded from the die.

The molten thermoplastic is extruded out of the annular die 1 and expanded into a tube 2 by the pressurized air from opening 3 in the centre of the die. The cooling ring 4 is shown mounted on a support plate 5 above the die and so located as to blow the cooling medium circumferentially on the blown tube. The position of the cooling ring is vertically adjustable by the support arms 6.

The cooling medium is supplied to the cooling ring from a stationary blower or other source of supply (not shown) to four inlet connections 7 on the body of the cooling ring.

Figure 2:
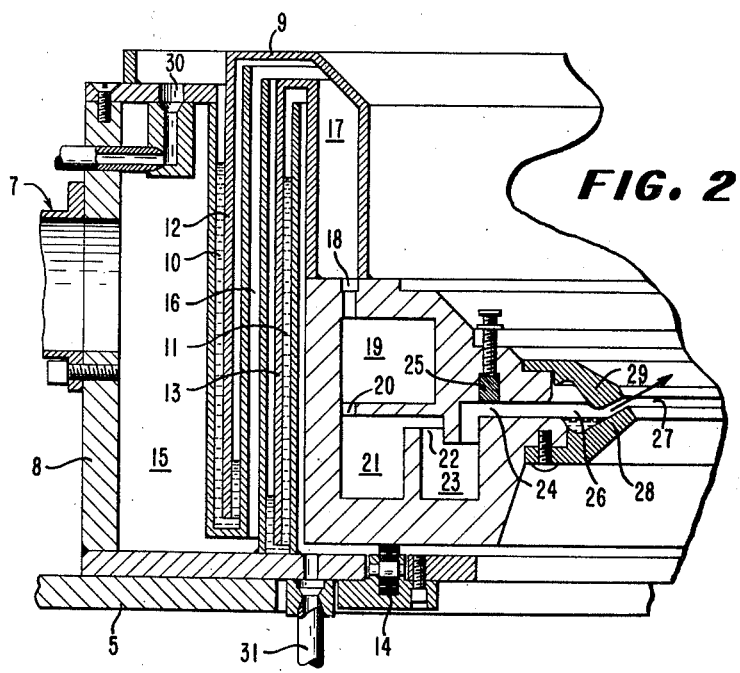
FIGURE 2 is an enlarged cross section of the cooling ring showing only one side and having greater detail than in FIGURE 1.

Referring now to FIGURE 2 it will be seen that the cooling ring is actually in two separate parts. The outer body 8 on which the inlet connections 7 are located is called the stator and the inner body 9 to which the annular outlet lips are connected is called the rotor.

The stator 8 is built with two concentric liquid filled annular chambers 10 and 11 while the rotor is equipped with two concentric skirts 12 and 13.

When the rotor is assembled with the stator, the two rotor skirts each fit separately into one of the two annular liquid filled chambers in the stator to form the liquid seals. The rotor rests on ball bearings 14 which are located in the base plate of the stator and provide smooth friction-free movement.

Following the cooling medium through the cooling ring will illustrate the operation of the apparatus.

The cooling medium is blown from the four inlet connections of the stator into the first annular chamber 15 where it is distributed around the periphery of said chamber, whence to chamber 16 between the legs of the two liquid seals. At this point the cooling medium leaves the stator section and enters the rotor section of the cooling ring.

From annular chamber 17 the cooling medium flows into the first ring of distribution holes 18, into an annular chamber 19, through the second ring of distribution holes 20, into annular chamber 21, annular orifice 22, annular chamber 23 and annular orifice 24. An adjustable restriction or metering gate 25 is located at this point to give very close control of the flows before the cooling medium enters the last annular expansion chamber 26 and hence to the outlet orifice 27 between the lips 28 and 29.

As the cooling medium passes through the series of alternate expansion chambers and restrictions the velocity and pressure alter. By this means the flow of the cooling medium is distributed very evenly about the periphery of the ring.

To facilitate assembly of the stator and rotor and to prevent accidents occurring during operation, the cooling ring is equipped with integral drains 30 and 31.

It will be noted that the lips are removable and various diameters of lips can be used on one cooling ring body to suit the diameter of the tubing being manufactured. One range of lips which can be used is:

6 inch lip diameter to 30 inch lip diameter on one ring body
30 inch lip diameter to 60 inch lip diameter on another ring body
60 inch lip diameter to 90 inch lip diameter on another ring body
90 inch lip diameter and up on another ring body.

*Example*

The following example illustrates the actual use of this cooling ring in practice, it being understood that such example does not limit the invention since only one of many possible arrangements is herebelow described.

Polyethylene having a density of .935 was extruded from a circular die 7½ inches in diameter. Air under pressure was admitted to the centre of the die and the tube was blown and expanded to 21 inches in diameter. The tube was carried vertically upward to a converging arrangement, hence to a pair of nip rolls and a slitter and winder.

The liquid sealed cooling ring was mounted above the die so as to blow the cooling medium on to the surface of the tube. The lips of the cooling ring were 18 inches in diameter.

In this example the cooling medium was air. The volume used was 150 cubic feet per minute and the pressure at the entrance to the cooling ring was 3.5 inches of water.

The main advantage of this invention of course, is the ability to rotate the most critical parts of the cooling ring, which is the combination of high pressure drop components embodied in the rotor, and the lips, without leaks or seal deterioration for an indefinite period of time.

The liquid seal can be designed to accommodate a large range of operating pressures. Two variables are present. One being the height of the leg on the seal and the other the specific gravity of the liquid in the seal. As a result this seal will operate over a range of from ½ inch of water up to 200 inches of water or more. In the latter case mercury would probably be used in the seal.

A list of thermoplastic material which can be used with the present invention in addition to conventional and linear polyethylene would include:

Copolymers of ethylene with:
  Butene
  Octene
  Isobutylene
  Propylene
Blends of polyethylene with:
  Polybutene
  Polyisobutylene
  Polypropylene
  Pigments Having fully disclosed the invention, what is claimed is:

1. A cooling ring mechanism for use in combination with an annular extrusion die for the extrusion of thermoplastic tubing, said mechanism comprising an annular stator portion and an annular rotor portion, said stator portion having an interior annular chamber and connected therewith an inlet portion for introducing a cooling medium into said annular chamber; said rotor portion having a plurality of concentrically arranged annular chambers connected in series by flow distribution holes, and a pair of outlet lips for said cooling medium connected to the last of said concentrically arranged annular chambers by a restricted passageway; said stator portion having a first and a second vertically disposed, concentric, annular cup member adapted to hold a sealing liquid, said rotor portion having a first and a second vertically disposed, concentric, skirt member positioned to fit downward into the respective cup members and below the surface of said sealing liquid, said first cup member and said second cup member positioned with respect to each other to define therebetween a narrow passageway connecting said annular chamber in said stator portion and the first of said series of annular chambers in said rotor portion, whereby said cooling medium passing in turn through said inlet portion, through said annular chamber in said stator portion, through said narrow passageway, through said series of annular chambers in said rotor portion, through said restricted passageway and between said pair of outlet lips is prevented by said sealing liquid from leaking outward to the atmosphere; and ball bearing means on which said rotor portion is rotatably mounted for rotary motion with respect to said stator portion.

2. A cooling ring mechanism as in claim 1 having in addition an adjustable metering gate positioned on said rotor portion and positioned so as to control the flow of said cooling medium through said restricted passageway.

3. A cooling ring mechanism as in claim 1 wherein said outlet lips are removably mounted permitting various diameters of lips to be used with one said cooling ring mechanism.

4. A cooling ring mechanism as in claim 1 mounted on an independent support mechanism having means for varying the distance between said outlet lips and said extrusion die.

5. A cooling ring mechanism as in claim 4, said independent support mechanism having connected thereto control means for remote control of said support mechanism.

References Cited by the Examiner

UNITED STATES PATENTS

| | | | |
|---|---|---|---|
| 2,770,009 | 11/56 | Rogal et al. | 18—14 |
| 2,926,384 | 3/60 | Hertz et al. | 18—14 |
| 2,947,031 | 8/60 | Ho Chow et al. | 18—14 |
| 2,955,321 | 10/60 | Fortner et al. | 18—14 |
| 3,088,167 | 5/63 | Corbett | 18—14 |
| 3,091,807 | 6/63 | Turner | 18—14 |

MICHAEL V. BRINDISI, *Primary Examiner.*

LESLIE H. GASTON, *Examiner.*